(12) United States Patent
Kim et al.

(10) Patent No.: US 10,707,924 B2
(45) Date of Patent: Jul. 7, 2020

(54) DISTRIBUTED ANTENNA SYSTEM FOR SUPPORTING MIMO SERVICE

(71) Applicant: KMW INC., Hwaseong-si (KR)

(72) Inventors: Duk-yong Kim, Hwaseong-si (KR); Young-chan Moon, Hwaseong-si (KR); Bung-chul Kim, Hwaseong-si (KR); Sang-hyo Kang, Hwaseong-si (KR)

(73) Assignee: KMW INC., Hwaseong-si (KR)

( * ) Notice: Subject to any disclaimer, the term of this patent is extended or adjusted under 35 U.S.C. 154(b) by 0 days.

(21) Appl. No.: 16/171,632

(22) Filed: Oct. 26, 2018

(65) Prior Publication Data

US 2019/0068250 A1 Feb. 28, 2019

Related U.S. Application Data

(63) Continuation of application No. PCT/KR2017/004575, filed on Apr. 28, 2017.

(30) Foreign Application Priority Data

Apr. 29, 2016 (KR) .................. 10-2016-0052972

(51) Int. Cl.
*H04B 7/024* (2017.01)
*H04B 7/0413* (2017.01)
(Continued)

(52) U.S. Cl.
CPC .......... *H04B 7/024* (2013.01); *H04B 7/0413* (2013.01); *H04B 10/2575* (2013.01); *H04W 84/045* (2013.01)

(58) Field of Classification Search
CPC .................................................... H04B 7/024
(Continued)

(56) References Cited

U.S. PATENT DOCUMENTS 6,111,870 A * 8/2000 Kurtz .................. H04B 14/046
358/434
2004/0001162 A1* 1/2004 Coffin, III ............. H04N 11/26
348/469
(Continued)

FOREIGN PATENT DOCUMENTS

JP 2011-155512 A 8/2011
JP 2014-520492 A1 1/2013
(Continued)

OTHER PUBLICATIONS

Japanse Office Action dated Sep. 10, 2019 for Japanese Application No. 2018-555739.
(Continued)

*Primary Examiner* — Lihong Yu

(57) ABSTRACT

A distributed antenna system supporting MIMO service is disclosed. Some embodiments provide a distributed antenna system supporting MIMO communication, including first node, second node and one transmission line. The first node receives MIMO downlink signals of a plurality of MIMO services each including N (a natural number of 2 or more) MIMO downlink signals, and performs, for each MIMO service, frequency-conversion of N–1 MIMO downlink signals among the N MIMO downlink signals, to different frequency band from original frequency band, to generate N MIMO downlink signals without mutually overlapping frequency bands. The second node performs, for each MIMO service, frequency-conversion of the MIMO downlink signals having been frequency-converted by first node, in a complementary manner, to reconstruct the MIMO downlink signals of original frequency band. The single transmission line is used between the first node and second node for transmitting N downlink signals without mutually overlapping frequency bands.

17 Claims, 13 Drawing Sheets

(51) Int. Cl.
*H04B 10/2575* (2013.01)
*H04W 84/04* (2009.01)

(58) Field of Classification Search
USPC .......................................................... 375/267
See application file for complete search history.

(56) References Cited

U.S. PATENT DOCUMENTS

| | | |
|---|---|---|
| 2008/0192855 A1 | 8/2008 | Shapira et al. |
| 2008/0232305 A1 | 9/2008 | Oren et al. |
| 2011/0135308 A1 | 6/2011 | Tarlazzi et al. |
| 2013/0177317 A1 | 6/2013 | Rospsha et al. |
| 2013/0195467 A1 | 8/2013 | Schmid et al. |
| 2017/0149550 A1* | 5/2017 | Choi .................... H04B 7/0413 |

FOREIGN PATENT DOCUMENTS

| | | |
|---|---|---|
| JP | 2013-038631 A | 2/2013 |
| JP | 2015-026984 A | 2/2015 |
| KR | 10-2013-0099984 A | 9/2013 |
| KR | 10-2013-0124339 A | 11/2013 |
| WO | 2011/071870 A1 | 6/2011 |
| WO | 2012/0044969 A1 | 4/2012 |
| WO | 2012/075137 A1 | 6/2012 |
| WO | 2016/057304 A1 | 4/2016 |

OTHER PUBLICATIONS

International Search Report for PCT/KR2017/004575 dated Aug. 11, 2017 and its English translation.
Extended European Search Report dated Oct. 25, 2019 for European Application No. 17789967.1.

* cited by examiner

DISTRIBUTED ANTENNA SYSTEM FOR SUPPORTING MIMO SERVICE

CROSS-REFERENCE TO RELATED APPLICATION

This application is a Continuation of International Application No. PCT/KR2017/004575, filed on Apr. 28, 2017, which claims priority and benefit of Korean Patent Application No. 10-2016-0052972, filed on Apr. 29, 2016 in Korea, the entire content of which is incorporated herein by reference.

TECHNICAL FIELD

The present disclosure relates to a wireless communication system, and more particularly, to a distributed antenna system (DAS) supporting a multiple input multiple output (MIMO) service.

BACKGROUND

The statements in this section merely provide background information related to the present disclosure and do not necessarily constitute prior art.

Wireless communication system attempts to adjust cell coverages in order to avoid shadow areas which, however, happen in the real world environment due to buildings, underground tunnels or the like. Distributed antenna system (hereinafter abbreviated as "DAS") has been used to provide service coverage to such shadow areas with multiple distributed antennas thereover.

Latest LTE and LTE-A services etc. are actively spreading, providing higher data transfer speed than the conventional 2G (GSM, CDMA) and 3G (W-CDMA). In LTE and LTE-A systems, Multiple Input Multiple Output (MIMO) technology is sought after for obtaining a high throughput in a limited bandwidth.

FIGS. 1A to 1D illustrate exemplary conventional DAS systems that do not support MIMO services. According to an example shown in FIG. 1A, a head-end unit is connected via a single coaxial cable to a remote unit which simultaneously provides a plurality of services via a plurality of relayed antennas. According to another example shown in FIG. 1C, the head-end unit is connected via a fiber optic cable to a hub unit which is connected to antenna-integrated remote units connected in a daisy-chain structure. Their services offered work in different frequency bands, and suffer from no mutual interference even if the services are propagated through one coaxial cable or one fiber optic cable.

The advent of MIMO technology has compromised this settlement. MIMO technology is to transmit and receive multiple MIMO signals sharing the common frequency band via multiple antennas. As a result, a distributed antenna system dedicated to Single Input Single Output (SISO), which is installed for the purpose of supporting 2G and 3G services, requires to connect LTE equipment supporting MIMO exclusively by 1T1R as in FIGS. 1A and 1C, or requires to install additional coaxial or fiber optic cables as in FIGS. 1B and 1D.

DISCLOSURE

Technical Problem

The present disclosure aims primarily to provide a distributed antenna system that can support LTE services using MIMO technology without the need to install additional cables.

SUMMARY

According to an aspect of the present disclosure, a distributed antenna system (DAS) supporting MIMO communication, includes a first node, a second node and a single transmission line. The first node is configured to receive MIMO downlink signals of a plurality of MIMO services each including N MIMO downlink signals (N is a natural number of 2 or more), and perform, for each MIMO service, a frequency conversion of N−1 MIMO downlink signals from among the N MIMO downlink signals, to a different frequency band from an original frequency band, to generate N MIMO downlink signals without mutually overlapping frequency bands. The second node is configured to perform, for each MIMO service, a frequency conversion of the MIMO downlink signals that have been frequency-converted by the first node, in a complementary manner, to reconstruct the MIMO downlink signals of the original frequency band. The single transmission line is configured to be used between the first node and the second node for transmitting N downlink signals without mutually overlapping frequency bands.

According to another aspect of the present disclosure, a method of supporting MIMO communication in a DAS is provided. The method has steps performed by a first node of the DAS, including receiving MIMO downlink signals of a plurality of MIMO services each including N MIMO downlink signals (N is a natural number of 2 or more), and performing, for each MIMO service, a frequency conversion of N−1 MIMO downlink signals from among the N MIMO downlink signals, to a different frequency band from an original frequency band, to generate N MIMO downlink signals without mutually overlapping frequency bands, and transmitting non-MIMO downlink signals and the N MIMO downlink signals of each MIMO service without mutually overlapping frequency bands, to the second node via the single transmission line. The method includes performing, by a second node, a frequency conversion of MIMO downlink signals having been frequency-converted by a master unit to a different frequency band from an original frequency band, in a complementary manner, to reconstruct the MIMO downlink signals of the original frequency band.

According to yet another aspect of the present disclosure, a master unit arranged at a first node of a distributed antenna system supporting MIMO communication, includes a first interface, a first frequency conversion circuit and a second interface. The first interface is configured to receive MIMO downlink signals of a plurality of MIMO services each including N MIMO downlink signals (N is a natural number of 2 or more). The first frequency conversion circuit is configured to perform, for each MIMO service, a frequency conversion of N−1 MIMO downlink signals from among the N MIMO downlink signals, to a different frequency band from an original frequency band, to generate N MIMO downlink signals without mutually overlapping frequency bands. The second interface is configured to combine the N downlink signals without mutually overlapping frequency bands, and to transmit a combined signal via a single transmission line. The master unit at the first node is responsible for performing frequency conversion, and is a head-end unit directly or indirectly connected to a plurality of base stations, or a hub unit connected to the head-end unit via a fiber optic cable.

According to yet another aspect of the present disclosure, a remote unit arranged at a second node of a distributed antenna system supporting MIMO communication, includes a first interface, a frequency conversion circuit and a second interface. The first interface is configured to receive, in different frequency bands via a single transmission line, MIMO downlink signals of a plurality of MIMO services each including N MIMO downlink signals (N is a natural number of 2 or more), of which N−1 MIMO downlink signals have been frequency-converted to a different frequency band from an original frequency band of each MIMO service. The frequency conversion circuit is configured to perform, for each MIMO service, a frequency conversion of the N−1 MIMO downlink signals, in a complementary manner, to reconstruct the N MIMO downlink signals of the original frequency band. The second interface is configured to transmit reconstructed N MIMO downlink signals to corresponding N MIMO antennas.

Advantageous Effects

As described above, according to some embodiments of the present disclosure, the DAS has the first node and the second node interconnected by a single transmission line, and distinguish the signals of the MIMO service by using frequency conversion, thereby avoiding mutual interference between signals while propagating through the single transmission line. The DAS according to some embodiments of the present disclosure uses only one transmission line as with the conventional DAS that exclusively supports non-MIMO services, obviating the need for installing an additional cable besides the existing cable installed.

In addition, the present disclosure relates to processing signals of a plurality of MIMO services in various embodiments which have different advantages and disadvantages in terms of the complexity of the filter block, the number of active devices required for the amplifier circuit, the width of the additional frequency band to be used, etc.

Furthermore, according to some embodiments of the present disclosure, the first node side transmits a mixing signal used for frequency conversion to the second node side, and the second node side performs symmetrical frequency conversion by using the received mixing signal, which cancels out the phase noise of the local oscillator of the head-end unit.

DETAILED DESCRIPTION

Hereinafter, some embodiments of the present disclosure will be described in detail with reference to the accompanying drawings.

As described in the description, the terms such as "unit," "module," and the like refer to units for processing at least one function or operation, which may be implemented by hardware, software, or a combination thereof. As described in the description, "frequency up-shift" and "frequency up-conversion" refers to converting the original frequency to another frequency, while "frequency down-conversion" and "frequency down-shift" refers to converting the shifted frequency to the original frequency.

Figure 1A:
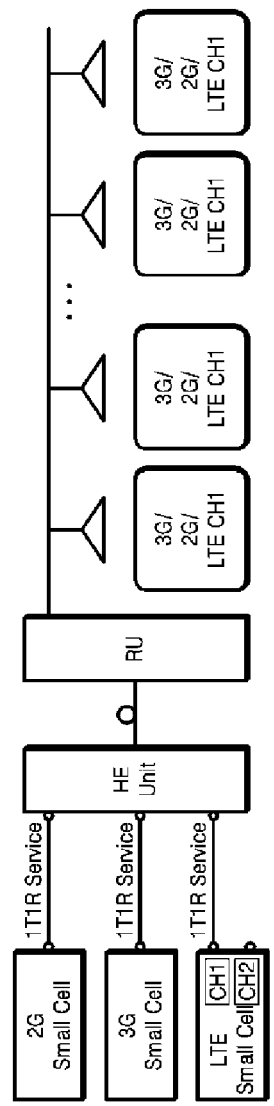
FIGS. 1A to 1D are diagrams of exemplary DAS systems that do not support conventional MIMO services.
Figure 1B:
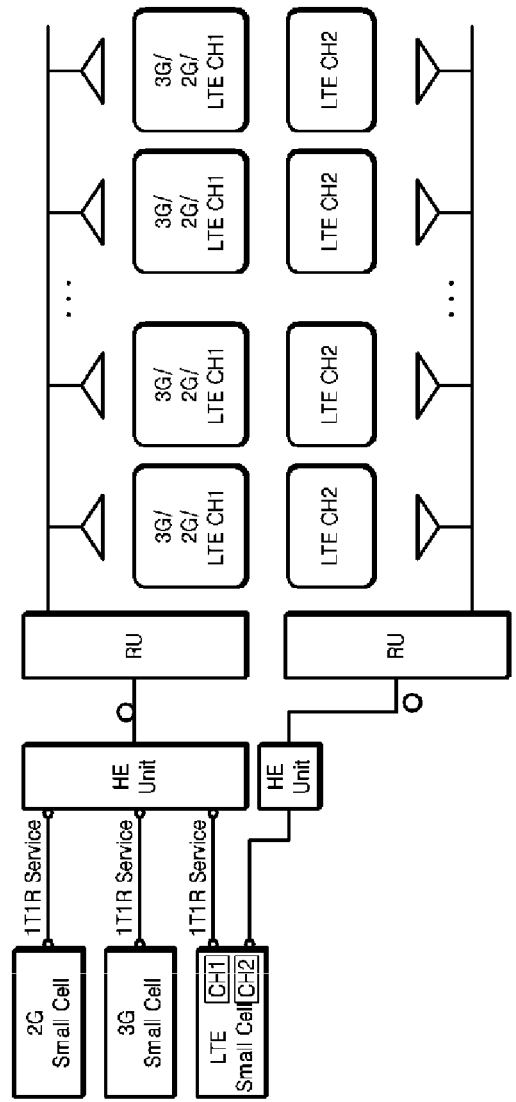
Figure 1C:
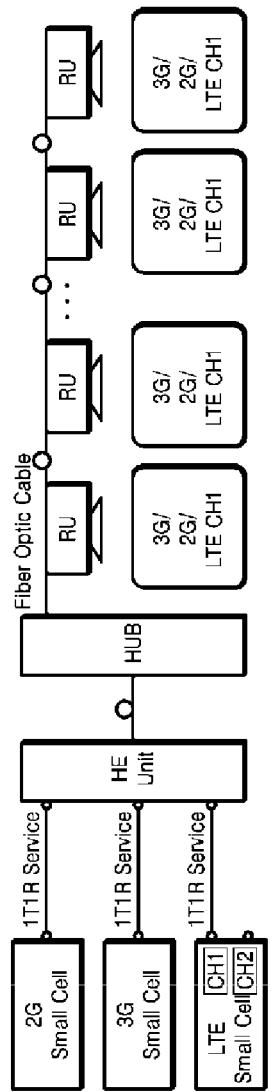
Figure 1D:
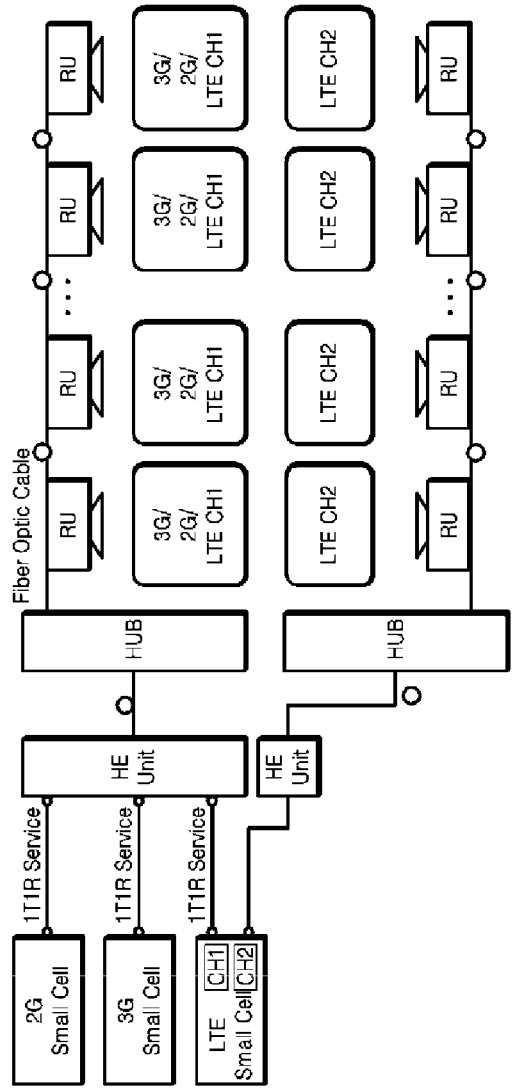
Figure 2:
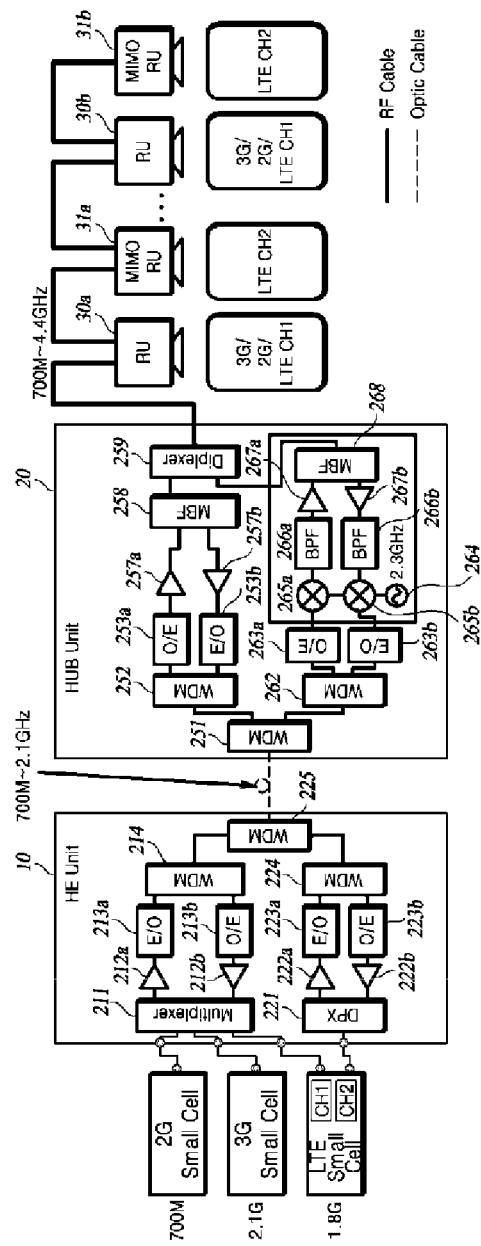
FIG. 2 is a schematic diagram of a structure in which a first node of a DAS is connected to a second node via a single coaxial cable, according to at least one embodiment of the present disclosure.
Figure 3:
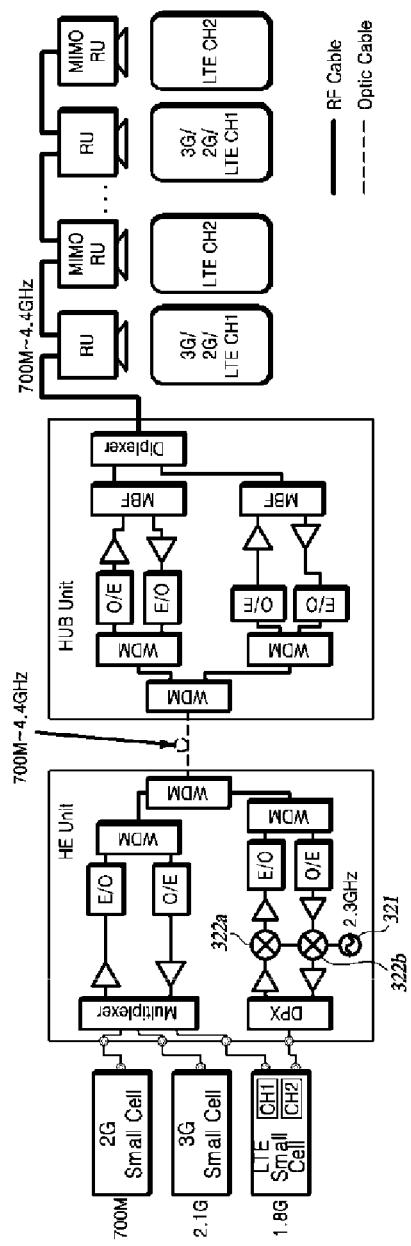
FIG. 3 is a schematic diagram of a structure in which a first node of a DAS is connected to a second node via a single coaxial cable, according to another embodiment of the present disclosure.
Figure 4:
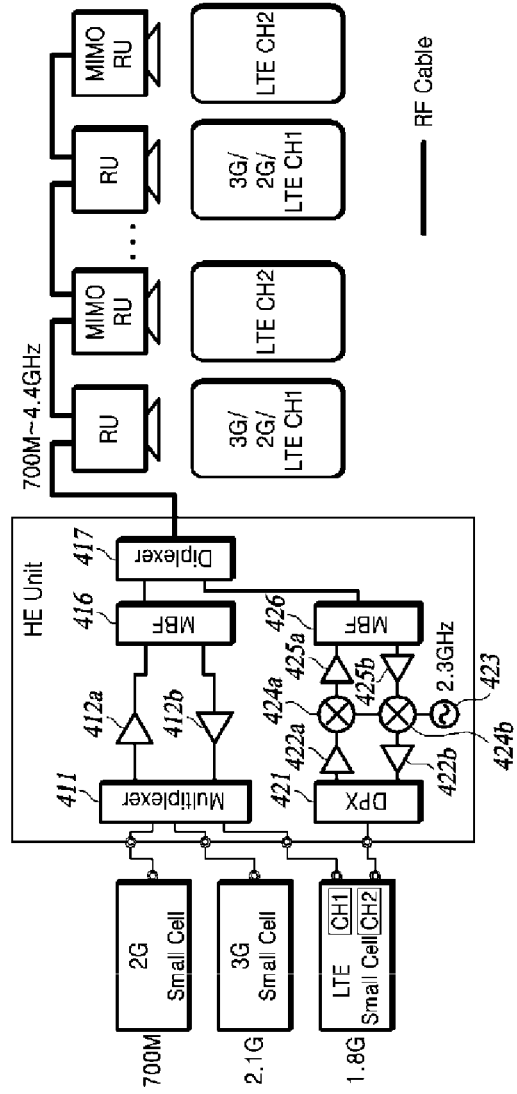
FIG. 4 is a schematic diagram of a structure in which a first node of a DAS is connected to a second node via a single coaxial cable, according to yet another embodiment of the present disclosure.

FIGS. 2, 3 and 4 schematically illustrate structures in which the first node of the DAS is connected to the second node via a single coaxial cable according to some embodiments. For the convenience of understanding the configuration and operation of the DAS according to some embodiments, FIGS. 2, 3 and 4 show an exemplary DAS supporting two non-MIMO services and one MIMO service. For the same purpose, the illustrated MIMO service is 2×2 MIMO service, or, it uses two MIMO signals respectively for uplink and downlink in the common frequency band. The above-mentioned numbers of non-MIMO and MIMO services and MIMO signals used for one MIMO service is illustrative and should not be construed as limiting the scope of the present disclosure.

In the embodiments shown in FIG. 2 and FIG. 3, the first node of the DAS has an arrangement of a head-end unit 10 and at least one hub unit 20 connected to the head-end unit 10 via a fiber optic cable. The head-end unit 10 may be directly connected to a plurality of base stations or indirectly connected via a bi-directional amplifier (BDA) or the like. The base stations include base stations that provide MIMO services such as 4G, 5G, 802.11n, WiMAX 802.16e as well as base stations that provide non-MIMO services such as 2G and 3G. The hub units are, for example, arranged on respective floors of a building, and they serve to relay signals between the remotely located parties of the head-end unit 10 and a plurality of remote units 30a, 30b, 31a, 31b, and to compensate for the attenuation of the RF signal by long-distance transmission.

Arranged in the second node of the DAS are the plurality of remote units 30a, 30b, 31a and 31b. The plurality of remote units 30a, 30b, 31a and 31b may be connected in a daisy-chain structure. The multiple remote units 30a, 30b, 31a and 31b connected in a daisy-chain structure are connected to the hub unit 20 of the first node via a single coaxial cable. The remote units 30a, 30b, 31a and 31b may be embodied as an antenna integrated type, or a discrete type separate from the antenna. In addition, the remote units 30a, 30b, 31a and 31b may be connected with a single antenna or a plurality of antennas.

Whereas, in the embodiment shown in FIG. 4, the first node has no hub unit, and a head-end unit is directly connected to a plurality of remote units via a single coaxial cable.

In the 2×2 MIMO service, two MIMO signals each use the common frequency band in the uplink and downlink paths. For example, MIMO downlink signals respectively output from an LTE small cell of FIG. 2 through channel 1 (CH1) and channel 2 (CH2) use the common frequency band, and MIMO uplink signals respectively input through channel 1 (CH1) and channel 2 (CH2) use the common frequency band, too. Therefore, while two MIMO signals of a MIMO service are propagated through a single coaxial cable, the signals need to be separated from each other through frequency conversion in order to avoid mutual interference therebetween. For example, when the first node and the second node transmit and receive the MIMO signals, the frequency up-conversion is performed at the transmission side node, and the frequency down-conversion to the original frequency is performed at the reception side node. These frequency up-conversion and frequency down-conversion are applied to both downlink and uplink, so frequency up-conversion and frequency down-conversion are performed on both the first node and the second node.

First, at least one embodiment of the present disclosure will be described with reference to FIG. 2.

FIG. 2 is a schematic diagram of a structure in which a first node of a DAS is connected to a second node via a single coaxial cable, according to at least one embodiment of the present disclosure.

FIG. 2 illustrates the head-end unit 10 which transmits and receives non-MIMO signals to and from a 2G base station and a 3G base station that provide a non-MIMO service, and transmits and receives two MIMO signals (i.e., a first MIMO signal and a second MIMO signal) to and from an LTE base station that provides a MIMO service. The head-end unit 10 transmits and receives the non-MIMO signals and the first MIMO signal to and from the base stations via a multiplexer 211. Further, the head-end unit 10 transmits and receives the second MIMO signal from the LTE base station via a duplexer 221.

Downlink and uplink are symmetrical to each other in processing, and therefore, the following description will focus on the signal processing in the downlink.

The non-MIMO downlink signals and the first MIMO downlink signals outputted from the multiplexer 211 of the head-end unit 10 are amplified by an amplifier circuit 212a, and then converted into optical signals of a first wavelength by an all-optical converter 213a. The second MIMO downlink signal output from the duplexer 221 is amplified by the amplifier circuit 221a, and then converted into an optical signal of a second wavelength by an all-optical converter 223a. The converted optical signals are transmitted to the hub unit 20 via a single fiber optic cable by using wavelength division multiplexing (WDM) modules 214, 224 an 225. The downlink optical signals and the uplink optical signals are individually divided by the optical signal wavelength. The WDM modules of the head-end unit 10 include a pair of WDM muxes 214, 224 for decoupling/coupling between the downlink optical signal and the uplink optical signal, and a WDM mux/demux 225 for decoupling/coupling between the "combined signal of the non-MIMO signals and the first MIMO signal" and "the second MIMO signal."

The hub unit 20 receives the multiplexed optical signal from the head-end unit 10 via the fiber optic cable. The WDM modules 251, 252 and 262 of the hub unit 20 divides (i.e., demultiplexes) the multiplexed optical signal into an optical signal of a first wavelength and an optical signal of a second wavelength. The optical signal of the first wavelength is converted into the "non-MIMO downlink signals and the first MIMO downlink signal" through an opto-electrical converter 253a. The converted signals are amplified and then input via a multiband filter (MBF) 258 to a diplexer 259. Here, the multiband filter performs filtering for each frequency band of the non-MIMO downlink signals and the first MIMO downlink signal, and/or multiplexes or demultiplexes these signals.

The optical signal of the second wavelength is converted to the "second MIMO downlink signal" through the opto-electrical converter 263a. The converted signal is frequency-converted by a frequency conversion circuit 264, 265a from the original frequency band of the relevant service to another free frequency band. The frequency-converted second MIMO signal is input to the diplexer 259 via a band pass filter (BPF) 266a, an amplifier circuit 267a and an MBF 268.

The diplexer 259 of the hub unit 20 combines the non-MIMO downlink signals, the first MIMO downlink signal and the frequency-converted second MIMO downlink signal, and transmits the combined signals through a single coaxial cable to the remote units 30a, 30b, 31a and 31b at the second node of the DAS. Mutual interference is eliminated between the first MIMO downlink signal input to the diplexer 259 and the frequency-converted second MIMO downlink signal since they have different frequencies. The diplexer 259 operates as a signal combiner in the downlink path, and operates as a signal splitter in the uplink path.

Among the multiple remote units 30a, 30b, 31a and 31b located at the second node of the DAS, the remote units 31a and 31b supporting MIMO receive the first MIMO downlink signal and the frequency-converted second MIMO downlink signal, propagates the first MIMO downlink signal through a first antenna, frequency-converts the frequency-converted second MIMO downlink signal to the original service frequency band, and then propagates the second MIMO downlink signal of the original service frequency band through a second antenna. The specific configuration and operation of the remote units 31a and 31b supporting MIMO will be described later. The remote units 30a and 30b that do not support MIMO selectively extract the non-MIMO downlink signals and the first MIMO downlink signal by using MBF or the like, and then propagate the selectively extracted signal through their own antennas.

Although some embodiments have been described to the effect that the remote units 31a and 31b supporting MIMO receive the first MIMO downlink signal and the frequency-converted second MIMO downlink signal, the present disclosure is not necessarily limited thereto. For example, the present disclosure is envisioned to have a configuration that the remote units 30a and 30b that do not support MIMO receive the first MIMO downlink signal and propagate the same through the antenna, and the remote units 31a and 31b supporting MIMO receive and frequency-convert the frequency-converted second MIMO downlink signal to the original service frequency band, and then propagate the second MIMO downlink signal of the original service frequency band through the antenna. In this case, the remote units 31a, 31b and the remote units 30a, 30b cooperate with each other to support the MIMO service.

As described above, downlink and uplink are symmetrical to each other in processing. In particular, the remote units 31a, 31b supporting MIMO take the second MIMO uplink signal between the first MIMO uplink signal and the second MIMO uplink signal received from the pair of antennas, to frequency-convert it from the original frequency band to another frequency band. The first MIMO uplink signal and the frequency-converted second MIMO uplink signal are transmitted to the hub unit 20 at the first node via the single coaxial cable. The hub unit 20 arranged at the first node frequency-converts the frequency-converted second MIMO uplink signal into a signal of the original frequency band.

FIG. 3 is a schematic diagram of a structure in which a first node of a DAS is connected to a second node via a single coaxial cable, according to another embodiment of the present disclosure. The embodiment shown in FIG. 3 is different from the embodiment shown in FIG. 2 in that the frequency conversion of the first node is performed not in the hub unit 20 but in the head-end unit 10. The other signal processing and the interface of the respective units are substantially the same between FIG. 2 and FIG. 3.

FIG. 4 is a schematic diagram of a structure in which a first node of a DAS is connected to a second node via a single coaxial cable, according to yet another embodiment of the present disclosure. In the embodiment shown in FIG. 4, the first node has no hub unit, and a plurality of remote units and a head-end unit are directly connected via the single coaxial cable. In the downlink, non-MIMO signals and first MIMO signals output from the multiplexer 411 are input to a diplexer 417 via an amplifier circuit 412a and an MBF 416. A second MIMO signal output from a duplexer 421 passes through an amplifier circuit 422a and a frequency conversion circuit 423, 424a. The frequency-converted signal is then inputted to the diplexer 417 via an amplifier circuit 425a and an MBF 426. The diplexer 417 combines and transmits the non-MIMO signals, the first MIMO signals and the frequency-converted second MIMO signal via a single coaxial cable to the remote units at the second node of the DAS.

Meanwhile, the frequency conversion is performed by mixing a mixing signal generated by a local oscillator (e.g., 264 in FIG. 2) with the second MIMO signal. Mixers (e.g., 265a, 265b in FIG. 2) mixes the second MIMO signal of frequency fr with the mixing signal of frequency fm. The output of the mixer has a frequency of $f_O = \pm f_r \pm f_m$. Here, the frequency of $-f_r - f_m$ is physically meaningless. Filters, for example, BPF 266a, 266b, MBF 268 and duplexer 221 in FIG. 2, which are positioned at the rear stage of the mixers, extract a desired frequency out of these possible frequency combinations.

Figure 5:
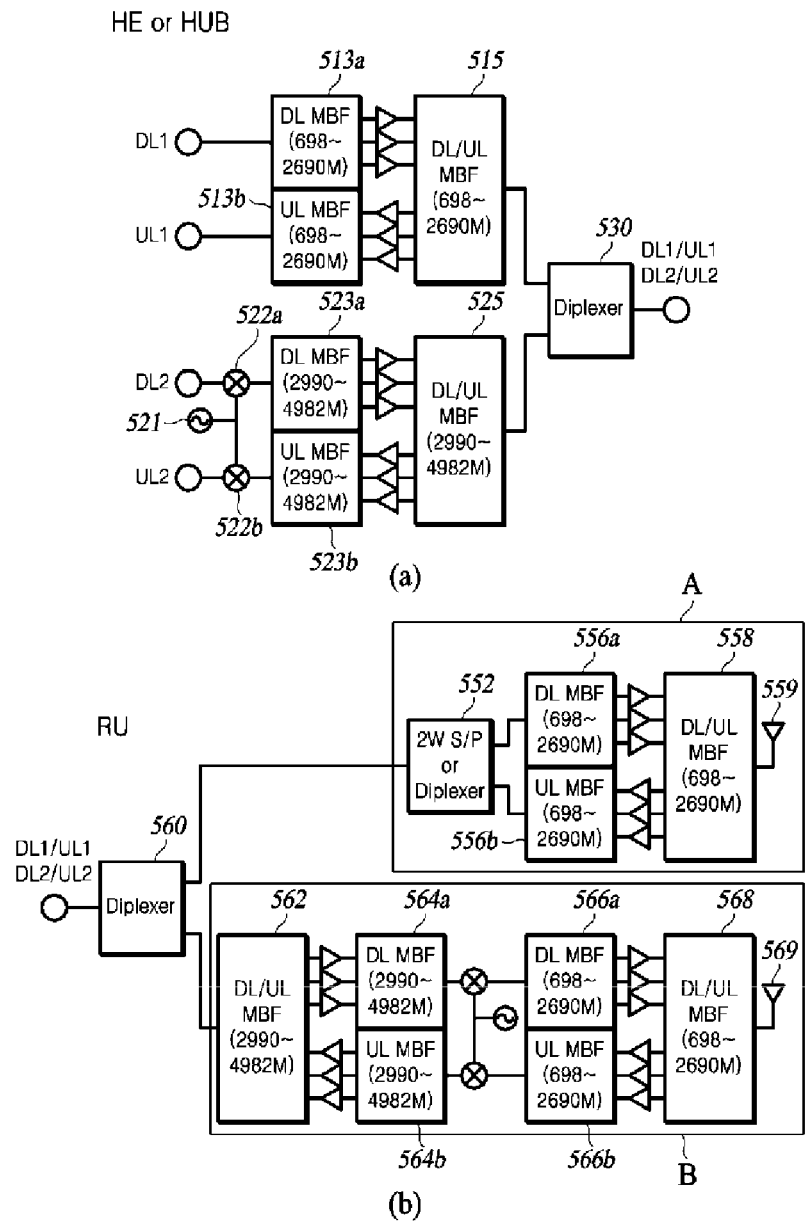
FIG. 5 is a schematic diagram of a configuration of a DAS system supporting three MIMO services, according to at least one embodiment of the present disclosure.
Figure 6:
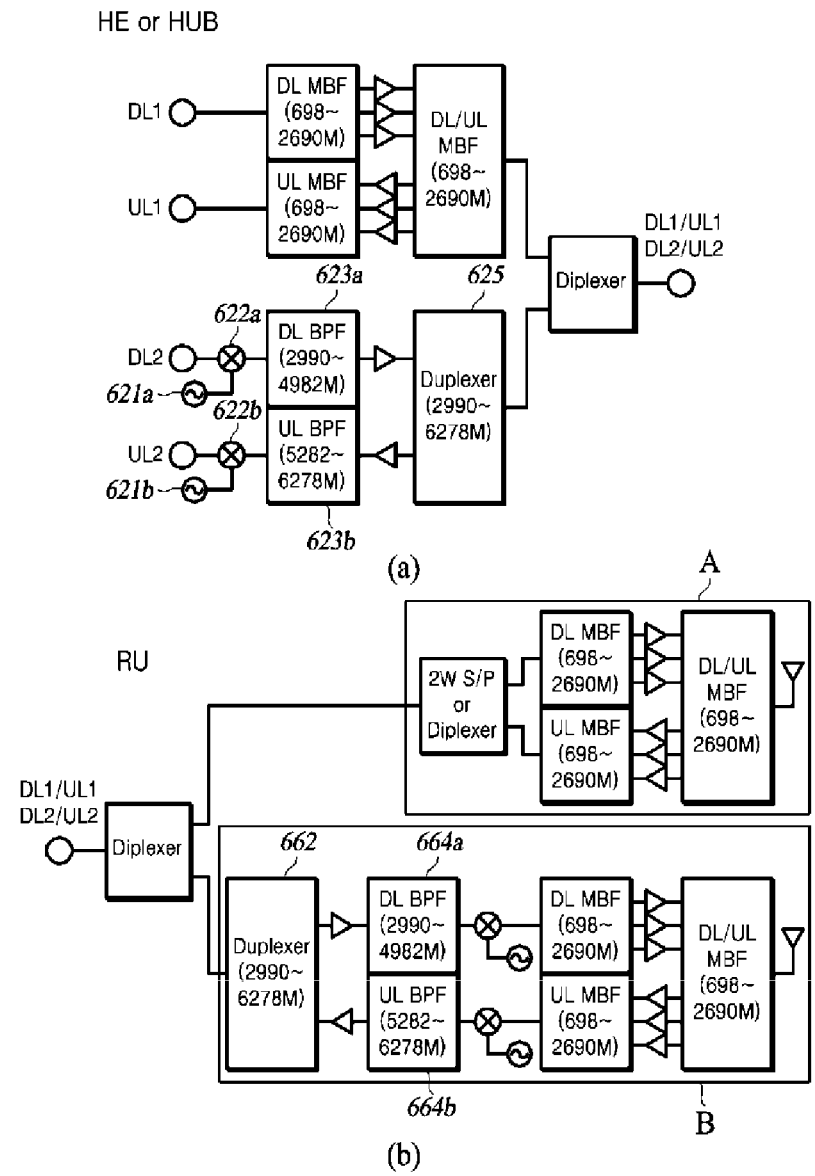
FIG. 6 is a schematic diagram of a configuration of a DAS system supporting three MIMO services, according to another embodiment of the present disclosure.
Figure 7:
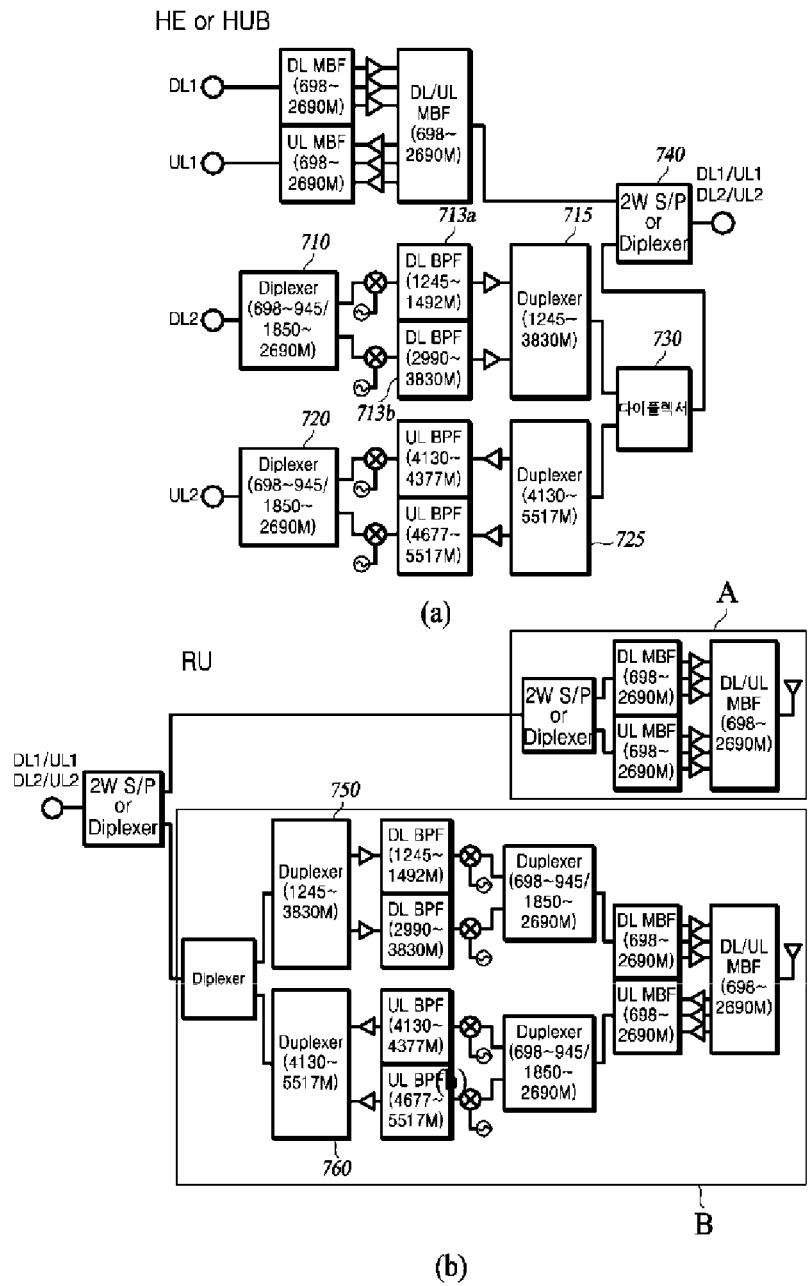
FIG. 7 is a schematic diagram of a configuration of a DAS system supporting three MIMO services, according to yet another embodiment of the present disclosure.

FIGS. 2, 3 4 show simplified DAS configurations supporting one MIMO service. The following refers to FIGS. 5 to 7, for describing several embodiments relating to the frequency conversion method of the DAS system supporting three MIMO services at the first node and the second node. In FIGS. 5 to 7, (a) shows a partial configuration of a head-end unit or a hub unit located at the first node of the DAS system, and (b) shows a remote unit, supporting MIMO and located at the second node. It should be noted that the configuration for non-MIMO service has been omitted to aid understanding of frequency conversion schemes for multiple MIMO services. To that end, FIGS. 5 to 7 omit the interface circuit (e.g., multiplexer, duplexer, WDM, etc.) for the head-end unit (or hub unit) located at the first node to transmit and receive MIMO signals to and from the base stations.

Example 1

Referring to (a) of FIG. 5, in some embodiments, the head-end unit or hub unit located at the first node of the DAS system receives two MIMO signals in the common frequency band for each MIMO service.

The first MIMO signals of the MIMO services are combined into one signal after their respective power levels are adjusted without frequency conversion in both the downlink/uplink path. In other words, the first MIMO downlink signals are separated by a downlink MBF 513a into individual bands, amplified respectively, and then combined into one signal by a downlink/uplink MBF 515. Similarly, the first MIMO uplink signals are separated into individual bands by the downlink/uplink MBF 515, amplified respectively, and then combined into one signal by a downlink MBF 513b.

The second MIMO downlink signals of the MIMO service are frequency-upconverted via a single mixer 522a without being separated into individual bands. Likewise, the second MIMO uplink signals are frequency-downconverted to the original frequency band via a single mixer 522b without being separated into individual bands. Furthermore, a common mixing signal generated by a single local oscillator 521 is used for the mixer 522a in the downlink path and the mixer 522b in the uplink path. Therefore, the second MIMO downlink signals and the second MIMO uplink signals have their frequency bands shifted by the same frequency (i.e., the frequency of the single mixed signal). The frequency-converted second MIMO downlink signals are separated into individual bands and amplified respectively by a downlink MBF 523a, and then combined into one signal by a downlink/uplink MBF 525.

The combined signal of the amplified first MIMO downlink signals and the combined signal of the amplified second MIMO downlink signals are further combined into one signal by a diplexer 530. The diplexer 530 operates as a signal combiner in the downlink path, and operates as a signal splitter in the uplink path.

Frequency conversion and signal amplification in a remote unit are carried out in substantially the same way as in the head-end unit (or hub unit). As shown in (b) of FIG. 5, the combined signals received from the first node are separated by a diplexer 560 into a combination signal of the first MIMO downlink signals and a combination signal of the second MIMO downlink signals. The combination signal of the first MIMO downlink signals are input via a bidirectional splitter or diplexer 552 to a downlink MBF. The combined signals are separated into individual bands and amplified by the downlink MBF, respectively, and then combined into a single RF signal and transmitted by a downlink/uplink MBF 558 to the relevant antenna 559. Once being separated into individual bands and amplified, the combination signal of the second MIMO downlink signals is processed by the downlink/uplink MBF 562 as with the combination signal of the first MIMO downlink signals.

In the present embodiment, a single remote unit is described as processing both the first MIMO downlink signals and the second MIMO downlink signals, but the present disclosure is not so limited. For example, in FIG. 5 at (b), a block A that processes the first MIMO downlink signals and a block B that processes the second MIMO downlink signals may be configured with separate RUs which are connected to each other by a diplexer. This applies to the embodiments of FIGS. 6 to 8.

This embodiment involves the common mixing signal to be mixed with the second MIMO signals without being separated from each other, imparting a relatively high complexity to the MBF supposed to extract a signal of a desired frequency band for each service from the mixed signal, which, however, is resolved by other embodiments described below. In addition, this embodiment needs the most active devices to perform the separation into each frequency band and then amplification in uplink/downlink paths. Notwithstanding, the use of the common mixing signal for the mixer of the downlink path and the mixer of the uplink path in this embodiment is advantageous in that it needs just one local oscillator and thus one phase lock loop (PPL) circuit for each of the first node and the second node.

Example 2

FIG. 6 is a schematic diagram of a configuration of a DAS system supporting three MIMO services, according to another embodiment of the present disclosure. The first MIMO signals of the MIMO service are processed in the downlink/uplink paths in the same way as in the embodiment of FIG. 5.

In the present embodiment, downlink frequency bands and uplink frequency bands are frequency-converted independently of each other. Specifically, at the first node, the second MIMO downlink signals are frequency-upconverted via a first local oscillator 621a and a first mixer 622a, and the second MIMO uplink signals are frequency-downconverted via a second local oscillator 621b and a second mixer 622b. Therefore, the downlink frequency bands are shifted by the frequency of the first mixing signal generated by the first local oscillator 621a, and the uplink frequency bands are shifted by the frequency of the second mixing signal generated by the second local oscillator 621b.

FIG. 6 illustrates the configuration in which a certain section has the second MIMO signals amplified without being separated into respective bands, and the other partial section has the second MIMO signals separated into respective bands and then amplified for each band. In the path through which the second MIMO signals pass, the embodiment of FIG. 5 utilizes the MBFs 523a, 523b, 525, 562, 564a, 564b, 566a, 566b, 568, etc., while the duplexers 625, 662 and the BPFs 623a, 623b, 664a, 664b are partially used in the embodiment of FIG. 6. Unlike the illustrated configuration, some embodiments envision separation into respective bands and band by band amplification in every section.

In this embodiment, the second MIMO signals are separated into uplink bands and downlink bands and then respectively frequency-converted, for which the multiband filter (MBF) is configured with an intermediate level of complexity falling between embodiment 1 and embodiment 3. In addition, this embodiment needs less active devices to perform separation just into uplink bands and downlink bands and then amplification thereof, which is advantageous in terms of power consumption. However, this embodiment involves the largest additional frequency band to be used among other embodiments since it performs separation into the uplink bands and downlink bands and frequency-converts them by their differential frequencies.

Example 3

FIG. 7 is a schematic diagram of a configuration of a DAS system supporting three MIMO services, according to yet another embodiment of the present disclosure. The first MIMO signals of the MIMO services are processed in the downlink/uplink paths in the same way as the embodiment of FIG. 5.

In the present embodiment, the downlink frequency bands and the uplink frequency bands are frequency-converted independently of each other. Further, the downlink frequency bands are classified into high frequency bands and low frequency bands, and then frequency-converted and amplified. Similarly, the uplink frequency bands are classified into high frequency bands and low frequency bands, and then frequency-converted and amplified.

As shown in FIG. 7 at (a) and (b), the second MIMO downlink signals are classified by duplexers 710 and 750 into a first group of signals corresponding to a high frequency band and a second group of signals corresponding to a low frequency band. The respective downlink groups have their separate frequency conversion circuits and amplifier circuits. Similarly, the second MIMO uplink signals are classified by duplexers 720 and 760 into a first group of signals corresponding to a high frequency band and a second group of signals corresponding to a low frequency band. The respective uplink groups have their separate frequency conversion circuits and amplifier circuits. Some embodiments classify the second MIMO uplink signals well into three or more groups of signals corresponding to adjacent frequency bands.

It is noted that this embodiment processes, in some section as in FIG. 6, the second MIMO signals without being separated into respective bands. In some sections, duplexers (715, 725, etc.) and BPFs (713a, 713b, etc.) are used.

In the DAS system of this embodiment, the filter block has the lowest complexity in terms of the remote unit. For each of downlink and uplink paths for the second MIMO signals, two local oscillators (thus two PLL circuits each) are required. Further, four groups can be frequency-converted independently of each other, and therefore the four groups can be independently frequency-shifted to appropriate frequency bands. Furthermore, this embodiment takes active devices more for signal amplification than the embodiment 2 does, yet needing less than those for embodiment 1 involving service by service classification.

The above embodiments are configured, in performing frequency conversion for three MIMO services, not to use distinct mixing signals for respective services, but to extract signals corresponding to the respective frequency bands via a filter block. Although the complexity of the filter block is increased compared to independently performing frequency conversions and filtering operations for the respective services, such embodiments reduce the number of frequency conversion circuits that could degrade error vector magnitude (EVM) characteristics due to a difference in phase noise.

Single Fiber Optic Cable Usage

Figure 8:
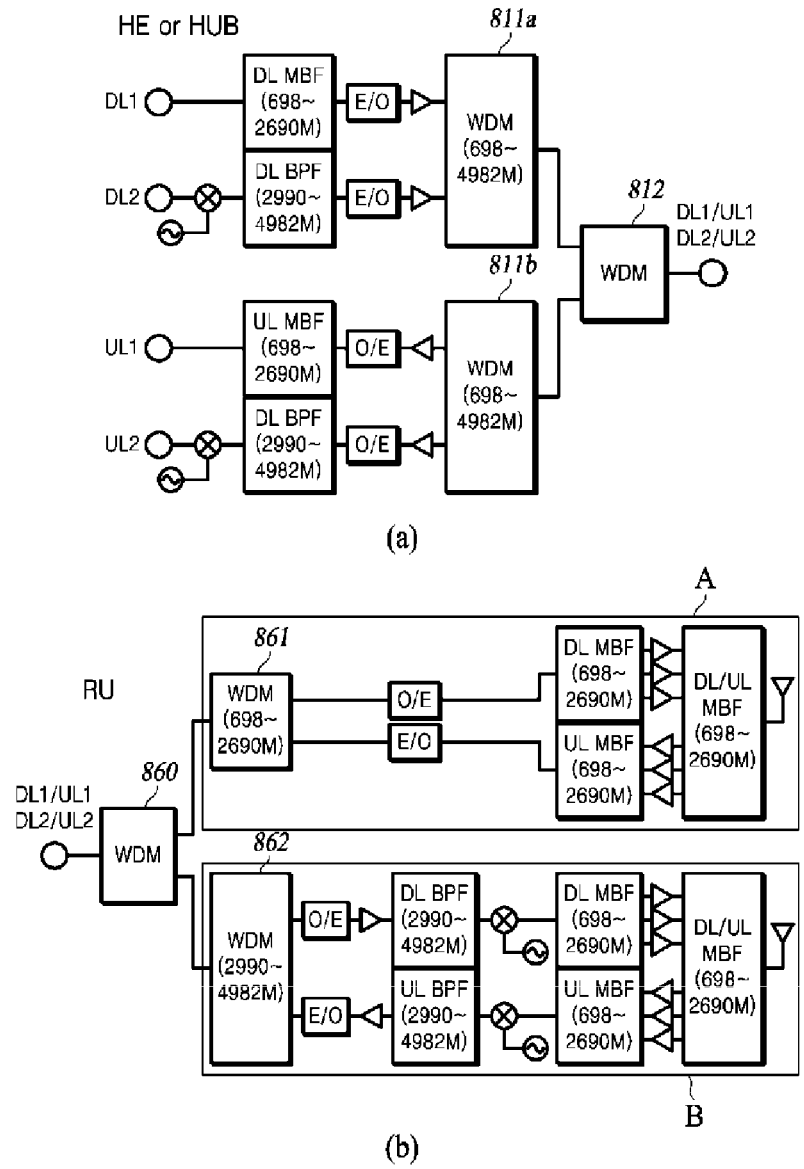
FIG. 8 is a diagram of an exemplary structure in which a first node of a DAS is connected to a second node via a single fiber optic cable, according to at least one embodiment of the present disclosure.

FIG. 8 is a diagram of an exemplary structure in which a first node of a DAS is connected to a second node via a single fiber optic cable, according to at least one embodiment of the present disclosure. Similar to FIGS. 2 to 4, the DAS illustrated in FIG. 8 utilizes three different frequency bands for supporting three different MIMO services, each utilizing two MIMO signals (i.e., first MIMO signal and second MIMO signal) in the common frequency band. It should be noted that the configuration for non-MIMO service has been omitted, to aid understanding of frequency conversion schemes for multiple MIMO services. For the same purpose, the present disclosure omitted the interface circuit (e.g., multiplexer, duplexer, WDM etc.) for the head-end unit (or hub unit) located at the first node to transmit and receive MIMO signals to and from the base station.

In the present embodiment, the first node of the DAS is connected to the second node of the DAS via a single fiber optic cable. The head-end unit or the hub unit arranged at the first node frequency-converts one of the two MIMO downlink signals for each MIMO service, and then utilizes wavelength division multiplexing (WDM) for transmitting the frequency-converted MIMO downlink signal to the remote unit located at the second node through the single fiber optic cable. Different wavelengths are allocated to the plurality of MIMO downlink signals.

The following describes the downlink path first.

For each MIMO service, the head-end unit HE or hub unit HUB arranged at the first node maintains the original MIMO downlink signal at the original frequency, and frequency-converts the second MIMO downlink signal to an unused frequency band. The first MIMO downlink signal and the frequency-converted second MIMO downlink signal are converted into optical signals of different wavelengths by a WDM module and then combined into one optical signal. The WDM-modulated signal is transmitted via a single fiber optic cable to a remote unit arranged at the second node. The illustrated WDM module of the first node includes a WDM MUX 811*a* for multiplexing downlink signals, a WDM DEMUX 811*b* for demultiplexing uplink signals, and a WDM MUX/DEMUX 812 for transmitting an optical downlink signal to the fiber optic cable and receiving optical uplink signals from the fiber optic cable.

A remote unit RU arranged at the second node transmits and receives the WDM-modulated signal from the WDM module via the fiber optic cable. The illustrated WDM module of the second node includes three WDM mus/demuxes 860, 861 and 862. The WDM mux/demux 860 demultiplexes the optical downlink signal received from the fiber optic cable into an optical signal of the wavelength corresponding to the first MIMO downlink signal and an optical signal of the wavelength corresponding to the second MIMO downlink signal. In addition, the WDM mux/demux 860 multiplexes and transmits the optical signal of the wavelength corresponding to the first MIMO uplink signal and the optical signal of the wavelength corresponding to the second MIMO uplink signal, to the fiber optic cable. The WDM mux/demux 861 and the WDM mux/demux 862 separate the uplink signal and the downlink signal based on their wavelengths, respectively.

The demultiplexed MIMO downlink signals are respectively converted into RF signals through opto-electrical conversion. The first MIMO downlink signal is propagated through a first antenna after passing through an amplifying circuit that amplifies for each frequency band of each service. The second MIMO downlink signal is first converted through frequency conversion to a signal in the original frequency band of each service. The second MIMO downlink signal converted to the original frequency band is amplified in the same way as with the first MIMO downlink signal and then propagated through a second antenna.

In the uplink path, the first MIMO uplink signal and the second MIMO uplink signal are processed symmetrically with the downlink path. The remote unit RU arranged at the second node receives the first MIMO uplink signal and the second MIMO uplink signal from the MIMO antennas (i.e., the first antenna and the second antenna). The remote unit RU maintains the original frequency of the received first MIMO uplink signal, and frequency-converts the second MIMO uplink signal from the original frequency band to a different frequency band. The first MIMO uplink signal and the frequency-converted second MIMO uplink signal are transferred by the WDM module to the first node via the single fiber optic cable.

Improvement of EVM

As described above, some embodiments perform frequency conversion (frequency up-conversion and frequency down-conversion) when transmitting MIMO signals between nodes of the DAS. For these frequency conversions, the error vector magnitude (EVM) characteristic deteriorates due to the difference in phase noise between the PLL circuits of the respective nodes. As is well known, when the EVM characteristic deteriorates, problems can occur in high-speed data transfer.

In consideration of this, some embodiments of the present disclosure have the first node side transmit a mixing signal used for frequency conversion (frequency up-conversion, frequency down-conversion) to the second node side, and have the second node side use the received mixing signal to perform the frequency conversion (frequency up-conversion, frequency down-conversion). For example, the head-end unit transmits a mixing signal which it used for frequency up-conversion when generated by its own local oscillator(s), along with MIMO signals via a single transmission cable to a plurality of remote units arranged at the second node. Each remote unit performs frequency down-conversion by using the received mixing signal. With such a configuration, the phase noise of the local oscillator of the head-end unit is symmetrically canceled in the remote unit through the frequency down-conversion process.

Figure 9:
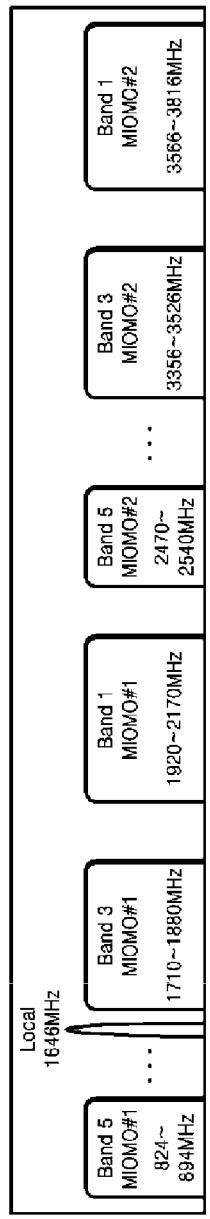
FIG. 9 is a diagram of frequency bands and mixing signals used to support three MIMO services.

FIG. 9 is a diagram of frequency bands and mixing signals used to support three MIMO services. The frequency bands exemplified in FIG. 9 exhibit three MIMO bands are commonly frequency-upconverted by 1646 MHz which is the frequency of the mixing signal. This corresponds to the embodiment of FIG. 2. It should be noted that in the embodiment of FIG. 2, the common mixing signal generated by a single local oscillator is used for the downlink path mixer and the uplink path mixer. Similarly, two mixing signals are transmitted to the second node side in the embodiment of FIG. 3, and four mixing signals are transmitted in the embodiment of FIG. 4.

Prevention of Intercell Interference

On the other hand, the second node of the DAS is arranged with a plurality of remote units connected in a daisy-chain structure. In this case, when servicing all the frequency bands for each remote unit, the signal quality may be deteriorated due to interference between the cells covered by each remote unit. In view of this, some embodiments of the present disclosure control the frequency band served by each remote unit, so that adjacent ones of the remote units in the daisy chain structure described above do not use a common frequency band therebetween. This can reduce interference between cells from using the common frequency band.

In the above embodiments, the multiple MIMO services has been illustrated as being respectively 2×2 MIMO services, although the methods illustrated can also be easily adapted by appropriate modifications to M×N MIMO services (e.g., 3×2 MIMO service, 3×3 MIMO service etc.).

Figure 10:
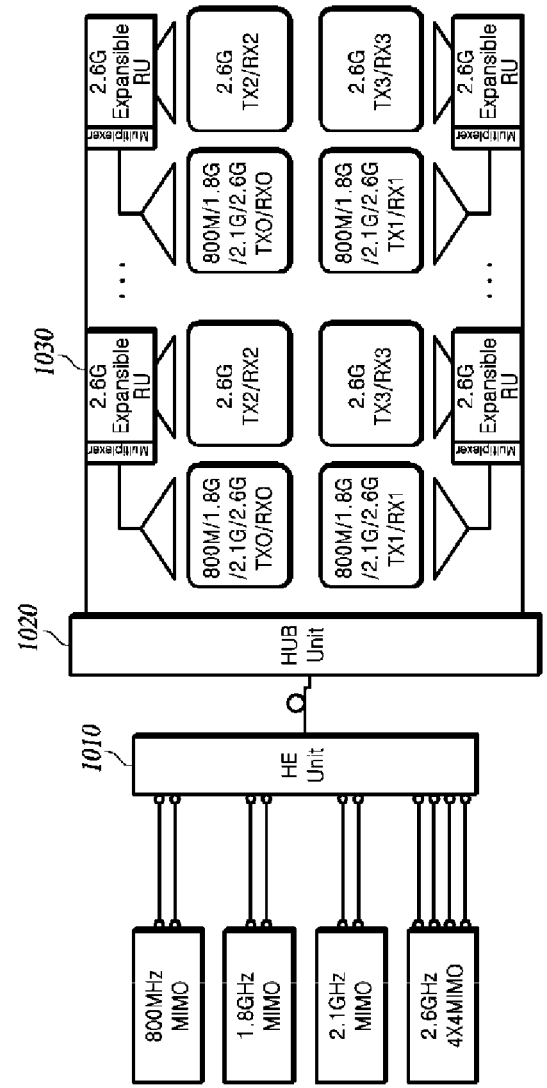
FIG. 10 is a schematic diagram of an exemplary DAS system for supporting a 4×4 MIMO service, according to at least one embodiment of the present disclosure.

FIG. 10 is a schematic diagram of an exemplary DAS system for supporting a 4×4 MIMO service, according to at least one embodiment of the present disclosure.

FIG. 10 shows an example distributed antenna system for supporting three different 2×2 MIMO services (800 MHz MIMO, 1.8 GHz MIMO, 2.1 GHz MIMO) and one 4×4 MIMO service (2.6 GHz MIMO).

The hub unit is connected to the head-end unit via one coaxial cable or fiber optic cable, and communicates 2×2 MIMO channel signals and 4×4 MIMO channel signals to and from the head-end unit. Expansible remote units at the second node are branched by two lines (i.e., the first coaxial cable and the second coaxial cable). The hub unit is connected to the first coaxial cable and the second coaxial cable, for example, via a diplexer.

The hub unit provides, for each 2×2 MIMO service, one 2×2 MIMO channel signal TX0 to the first coaxial cable, and another 2×2 MIMO channel signal TX1 to the second coaxial cable. In addition, the hub unit provides, for the 4×4 MIMO service, two 4×4 MIMO channel signals TX0, TX2 to the first coaxial cable, and remaining two 4×4 MIMO channel signals TX1, TX3 to the second coaxial cable. Here, in order to avoid mutual interference between the two 4×4 MIMO channel signals TX0, TX2 when provided to and propagating through the first coaxial cable, one 4×4 MIMO channel signal TX2 is frequency-converted from an original frequency band to a different frequency band. Similarly, of the two 4×4 MIMO channel signals TX1, TX3 provided to the second coaxial cable, one (TX3) is frequency-converted from its original frequency band to a different frequency band.

Each of the expansible remote units uses, for example, a multiplexer to separate the MIMO channel signals received in the original frequency band from the 4×4 MIMO channel signal having been frequency-converted to a different frequency band, propagates the MIMO channel signals in the original frequency band through a first antenna, and frequency-converts the frequency-converted 4×4 MIMO channel signal back into the original frequency band and then propagates the 4×4 MIMO channel signal in the original frequency band through a second antenna. Although the above explanation is given from the downlink perspective, uplink processing is envisioned in a complementary manner as a matter of course.

Although exemplary embodiments of the present disclosure have been described for illustrative purposes, those skilled in the art will appreciate that various modifications, additions and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

The invention claimed is:

1. A distributed antenna system (DAS) supporting multiple input multiple output (MIMO) communication, comprising:
   a first node configured to
   receive MIMO downlink signals of a plurality of MIMO services, the MIMO downlink signals of each MIMO service including a first channel downlink signal and a second channel downlink signal, and
   perform, for each MIMO service, a frequency conversion of the second channel downlink signal, to a different frequency band from an original frequency band, to generate MIMO downlink signals without mutually overlapping frequency bands; and
   a second node configured to
   receive the MIMO downlink signals without mutually overlapping frequency bands from the first node via a single transmission line, and
   perform, for each MIMO service, a frequency conversion of the second downlink signal that have been frequency-converted by the first node, in a complementary manner, to reconstruct the MIMO downlink signals of the original frequency band, and
   characterized in that the first node or the second node, in performing the frequency conversion, is configured to divide the plurality of MIMO services into two or more service groups by grouping at least two MIMO services which uses adjacent original frequency bands, combine the second channel downlink signals of each service group into a respective combined signal, and performs frequency-shift on the respective combined signal of each service group.

2. The distributed antenna system of claim 1, wherein the first node comprises a head-end unit connected to at least one base station, and a hub unit connected to the head-end unit via a fiber optic cable, and
   wherein the hub unit is connected to the second node via the single transmission line.

3. The distributed antenna system of claim 2, wherein the frequency conversion in the first node is performed by the head-end unit.

4. The distributed antenna system of claim 2, wherein the frequency conversion in the first node is performed by the hub unit.

5. The distributed antenna system of claim 1, wherein the first node is configured to additionally transmit mixing signals used for the frequency conversion via the single transmission line, and
   wherein the second node is configured to perform the complementary manner of frequency conversion by using the mixing signals having been received from the first node.

6. The distributed antenna system of claim 1, wherein the single transmission line comprises a single coaxial cable.

7. The distributed antenna system of claim 1, wherein the single transmission line comprises a single fiber optic cable, and
   wherein the first node is configured to transmit the N downlink signals without mutually overlapping frequency bands by using Wavelength Division Multiplexing (WDM) to the second node via the single fiber optic cable.

8. The distributed antenna system of claim 1, wherein the second node includes a plurality of remote units connected in a daisy-chain structure, and adjacent ones of the remote units do not use a common frequency band.

9. The distributed antenna system of claim 1, wherein the plurality of MIMO services has at least some services that utilize different numbers of MIMO downlink signals from each other.

10. A distributed antenna system (DAS) supporting multiple input multiple output (MIMO) communication, comprising:
   a first node configured to
   receive MIMO downlink signals of a plurality of MIMO services, the MIMO downlink signals of each MIMO service including a first channel downlink signal and a second channel downlink signal, and
   perform, for each MIMO service, a frequency conversion of the second channel downlink signal, to a different frequency band from an original frequency band, to generate MIMO downlink signals without mutually overlapping frequency bands; and a second node configured to
receive the MIMO downlink signals without mutually overlapping frequency bands from the first node via a single transmission line, and
perform, for each MIMO service, a frequency conversion of the second downlink signal that have been frequency-converted by the first node (10, 20), in a complementary manner, to reconstruct the MIMO downlink signals of the original frequency band, and wherein the second node is configured to
receive, from antennas, MIMO uplink signals of the plurality of MIMO services, the MIMO uplink signals of each MIMO service including a first channel uplink signal and a second channel uplink signal,
perform, for each MIMO service, a frequency conversion of the second channel uplink signal, to a different frequency band from an original frequency band, to generate MIMO uplink signals without mutually overlapping frequency bands, and
transmit the MIMO uplink signals without mutually overlapping frequency bands to the first node via the single transmission line; and wherein the first node is configured to frequency convert the second channel uplink signal for each MIMO service, in a complementary manner, to reconstruct the MIMO uplink signals of the original frequency band, characterized in that the first node or the second node is further configured to combine the second channel downlink signals of the plurality of MIMO services into a combined second channel downlink signal, and frequency-shifts the combined second channel downlink signal using a first mixer, and the first node or the second node is further configured to combine the second channel uplink signals of the plurality of MIMO services into a combined second channel uplink signal, and frequency-shifts the combined second channel uplink signal using a mixing signal using a second mixer.

11. The distributed antenna system of claim 10, wherein the first node or the second node is configured to use a common mixing signal outputted from a common local oscillator for the frequency conversion of downlink signals and for the complementary manner of frequency conversion of uplink signals.

12. The distributed antenna system of claim 10, wherein the first node or the second node is configured to use distinct mixing signals outputted from distinct local oscillators for the frequency conversion of downlink signals and for the complementary manner of frequency conversion of uplink signals.

13. A node in a distributed antenna system (DAS) supporting multiple input multiple output (MIMO) communication, wherein the first node is configured to:
receive MIMO downlink signals of a plurality of MIMO services, the MIMO downlink signals of each MIMO service including a first channel downlink signal and a second channel downlink signal, and
perform, for each MIMO service, a frequency conversion of the second channel downlink signal, to a different frequency band from an original frequency band, to generate MIMO downlink signals without mutually overlapping frequency bands,
wherein the node is further configured to, in performing the frequency conversion, divide the plurality of MIMO services into two or more service groups by grouping at least two MIMO services which uses adjacent original frequency bands, combine the second channel downlink signals of each service group into a respective combined signal, and performs frequency-shift on the respective combined signal of each service group.

14. The node of claim 13, wherein the node comprises a head-end unit connected to at least one base station, and a hub unit connected to the head-end unit via a fiber optic cable.

15. The node of claim 14, wherein the frequency conversion in the node is performed by the head-end unit.

16. The node of claim 14, wherein the frequency conversion in the node is performed by the hub unit.

17. The node of claim 13, wherein the node is configured to additionally transmit mixing signals used for the frequency conversion via the single transmission line.

* * * * *